(12) United States Patent
Sharlin et al.

(10) Patent No.: US 12,372,700 B2
(45) Date of Patent: *Jul. 29, 2025

(54) METHOD OF FABRICATING A LIGHT-GUIDE OPTICAL ELEMENT

(71) Applicant: Lumus Ltd., Ness Ziona (IL)

(72) Inventors: Elad Sharlin, Mishmar David (IL); Dror Hermoni, Kibbutz Usha (IL)

(73) Assignee: Lumus Ltd., Ness Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,372

(22) Filed: Jun. 20, 2024

(65) Prior Publication Data
US 2024/0337780 A1    Oct. 10, 2024

Related U.S. Application Data

(63) Continuation of application No. 17/429,977, filed as application No. PCT/IB2020/053492 on Apr. 14, 2020, now Pat. No. 12,135,445.

(60) Provisional application No. 62/833,808, filed on Apr. 15, 2019.

(51) Int. Cl.
G02B 5/28    (2006.01)
B29D 11/00   (2006.01)
G02B 27/01   (2006.01)

(52) U.S. Cl.
CPC ........ G02B 5/285 (2013.01); B29D 11/00663 (2013.01); B29D 11/00865 (2013.01); G02B 27/0172 (2013.01)

(58) Field of Classification Search
CPC ............... G02B 5/285; G02B 27/0172; B29D 11/00663; B29D 11/00865
USPC .......................................................... 359/584
See application file for complete search history.

(56) References Cited

FOREIGN PATENT DOCUMENTS

JP    H7-311303    11/1995
JP    2006083404   3/2006

*Primary Examiner* — Wyatt A Stoffa
*Assistant Examiner* — Grant A Gagnon
(74) *Attorney, Agent, or Firm* — Rivka Friedman (57) ABSTRACT

A method of fabricating a light-guide optical element having a plurality of partially reflecting surfaces is disclosed. The method includes providing a plurality of transparent plates, each plate polished on two opposite surfaces such that the surfaces are parallel to each other, coating a first of the surfaces of a subset of plates with a first coating, coating a second of the surfaces of the subset of plates with a second coating; bonding together the plurality of transparent plates to form a stack, and cutting the stack along parallel planes obliquely angled to the faces of the transparent plates so as to form the optical element, wherein the first coating is a partially reflective coating have a first set of mechanical properties, and the second coating is selected from the group consisting of: a coating similar to the first coating and a non-reflective coating having a second set of mechanical properties substantially similar to the first set of mechanical properties.

3 Claims, 8 Drawing Sheets

METHOD OF FABRICATING A LIGHT-GUIDE OPTICAL ELEMENT

TECHNICAL FIELD

The presently disclosed subject matter relates to a light-guide optical element, and, more particularly, to methods of fabricating a light-guide optical element.

BACKGROUND

Certain head-mounted displays (HMD) employ a light-guide optical element ("LOE"), also called a waveguide, that operates by trapping light waves inside a substrate by total internal reflections from the external surfaces of the waveguide. The light waves which are trapped inside the waveguide are coupled out by an array of partially reflective surfaces. The internal surfaces of the waveguide are typically made by joining a number of transparent flat plates. Prior to joining the plates, the plates are typically coated on one surface with a thin film partially reflective coating. In order to maintain image quality, the plates should be as flat as possible. However, the thin film and/or the coating process can impose stress on the plates and cause the plates to warp, leading to undesired curvature of the plates and a degradation of the quality of an image delivered by the LOE.

SUMMARY

According to one aspect of the presently disclosed subject matter there is provided a method of fabricating a light-guide optical element having a plurality of partially reflecting surfaces. The method includes providing a plurality of transparent plates, each plate polished on two opposite surfaces such that the surfaces are parallel to each other; coating a first of the surfaces of a subset of plates with a first coating; coating a second of the surfaces of the subset of plates with a second coating; bonding together the plurality of transparent plates to form a stack; and cutting the stack along parallel planes obliquely angled to the faces of the transparent plates so as to form the optical element; wherein the first coating is a partially reflective coating having a first set of mechanical properties, and the second coating is selected from the group consisting of: a coating similar to the first coating and a non-reflective coating having a second set of mechanical properties substantially similar to the first set of mechanical properties.

According to another aspect of the presently disclosed subject matter there is provided a light-guide optical element having at least one pair of parallel external surfaces including a plurality of partially reflecting surfaces made from a plurality of transparent plates having surfaces that are non-parallel to the pair of parallel external surfaces, each plate polished on two opposite surfaces such that the surfaces are parallel to each other; wherein each plate in a subset of plates is coated on one surface with a first coating and coated on the second surface with a second coating, wherein the first coating is a partially reflective coating having a first set of mechanical properties, and the second coating is selected from the group consisting of: a coating similar to the first coating and a non-reflective coating having a second set of mechanical properties substantially similar to the first set of mechanical properties.

According to some aspects of the presently disclosed subject matter the subset of plates is comprised of alternate plates in the plurality of plates, and the second coating is a coating similar to the first coating. At least one plate of the plurality of plates can be coated on a first surface with the first coating and on a second surface with a non-reflective coating having the second set of mechanical properties.

According to some aspects of the presently disclosed subject matter the subset of plates is comprised of all plates in the plurality of plates, and the second coating is a non-reflective coating having a second set of mechanical properties substantially similar to the first set of mechanical properties.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Figure 1A:
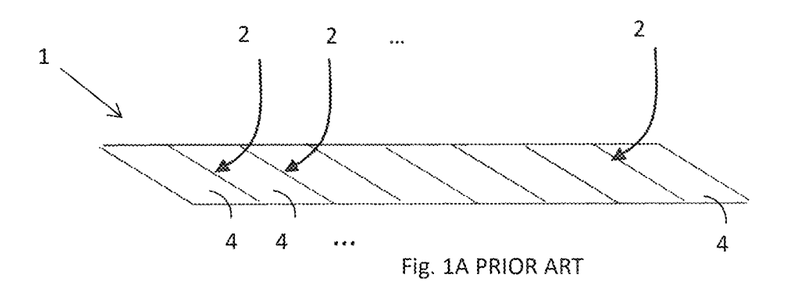
FIG. 1A illustrates a side view of a LOE according to the prior art.
Figure 1B:
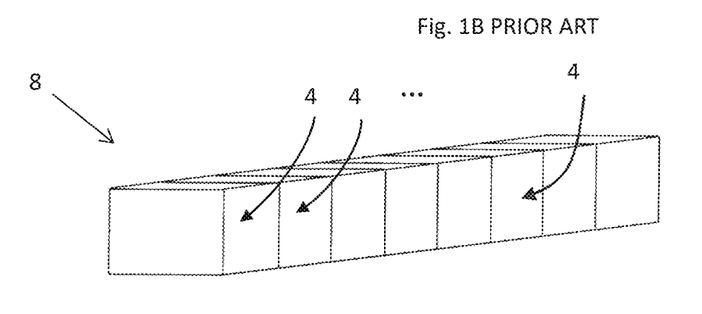
FIG. 1B illustrates an isometric view of a LOE according to the prior art.
Figure 1C:
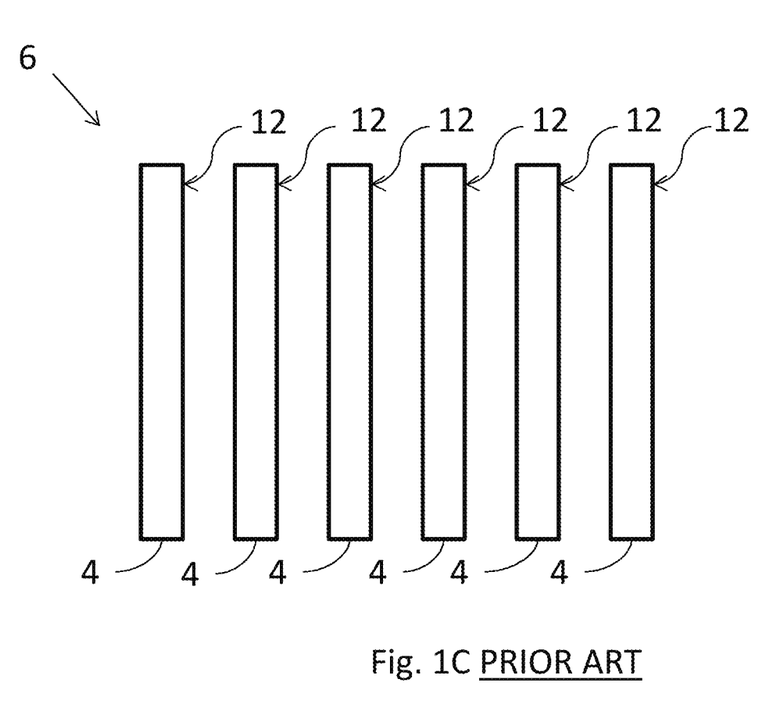
FIG. 1C illustrates a method of manufacture of a LOE according to the prior art.

Bearing this in mind, reference is now made to FIGS. 1A-1C, where there is illustrated a LOE made according to the prior art. FIG. 1A illustrates a side view of a LOE 8 having a plurality of plates 4 and a plurality of partially reflective internal surfaces 2. FIG. 1B illustrates an isometric view of LOE 8. FIG. 1C illustrates a prior art method of manufacture of LOE 8 in which each plate 4, prior to joining, is coated on one surface with a thin film partially reflective coating 12. As further illustrated in FIGS. 4A-4B, in which alternative prior art methods are shown, the plates are then bonded together to form a stack 6, and the stack sliced along parallel planes 16 to form LOE 8.

Typically, the partially reflective coating imposes a certain amount of stress on the surface to which it is applied. When applied to one surface of each plate and not the other, this stress can lead to the plate warping, creating an undesired curvature in the plate, which in turn can lead to the LOE propagating a poor quality image. The amount of warping is generally determined by the mechanical properties of the particular coating, e.g. the stress characteristics of the thin film coating, and/or as a result of the coating process. For example, the coating materials can have inherent properties that relate to stress caused in the coated film. These properties include a directional stress property, which can be, for example, tensile or compressive. The stress can be caused by different expansion coefficients under temperature change of the various coating layers and/or materials, or between the coating and the plate.

The inventors have found a way to mitigate the negative effects of stress on a plate caused by the partially reflective coating, thereby reducing the amount of warping or eliminating it altogether. Specifically, according to certain particularly preferred implementations of the present invention, some or all of the plates are coated on opposing surfaces with coatings that have similar stress characteristics, as will be more fully detailed below.

Figure 2A:
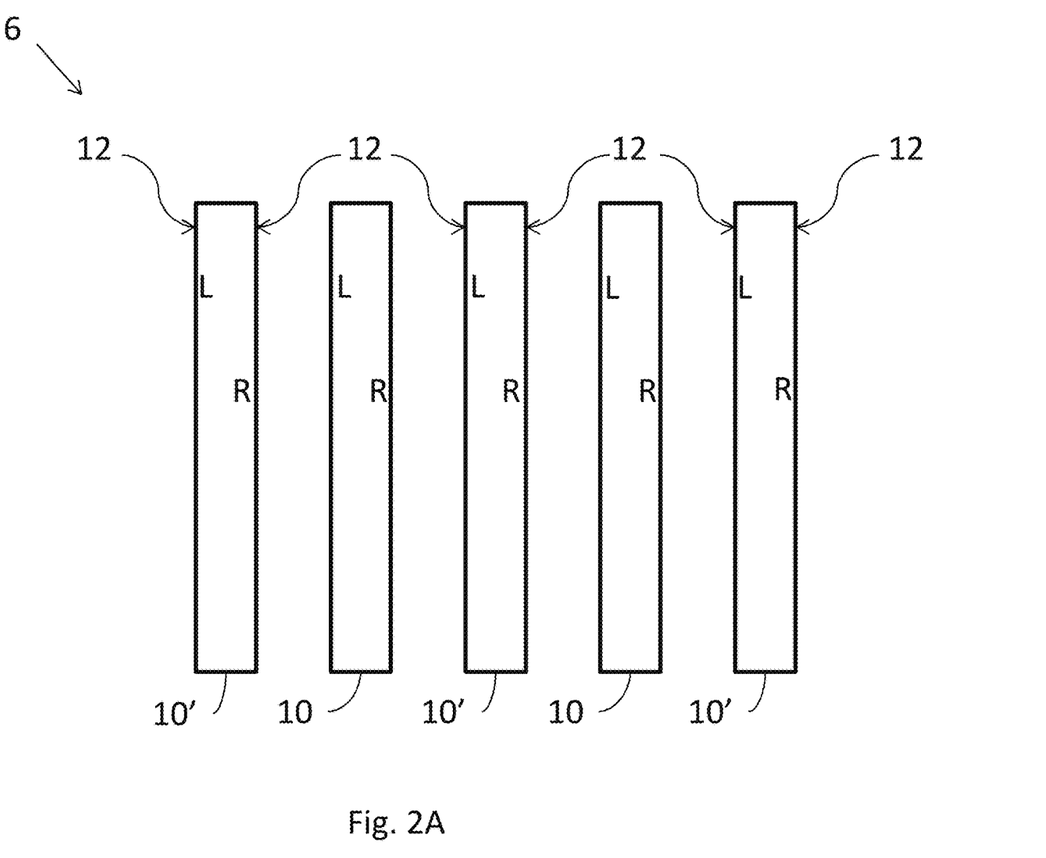
FIG. 2A illustrates a method of manufacturing a LOE according to a first embodiment of the presently disclosed subject matter.
Figure 2B:
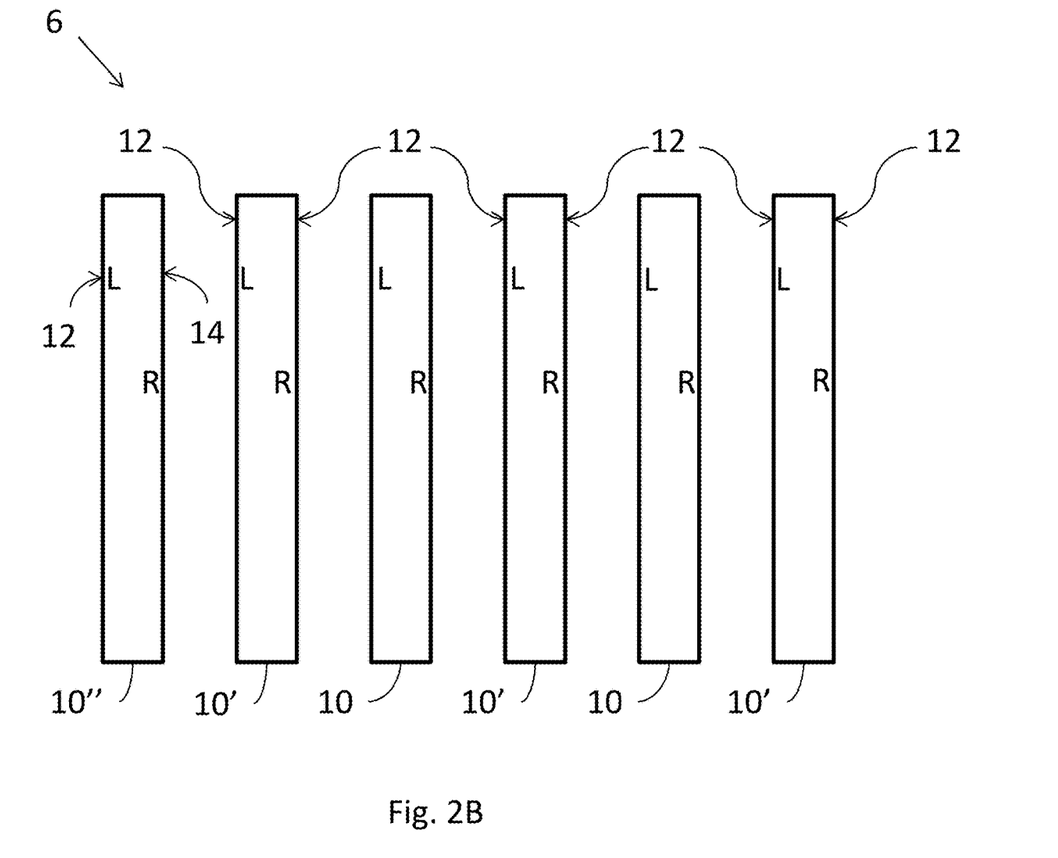
FIG. 2B illustrates a particularly preferred method of manufacturing a LOE according to the first embodiment of the presently disclosed subject matter.
Figure 3:
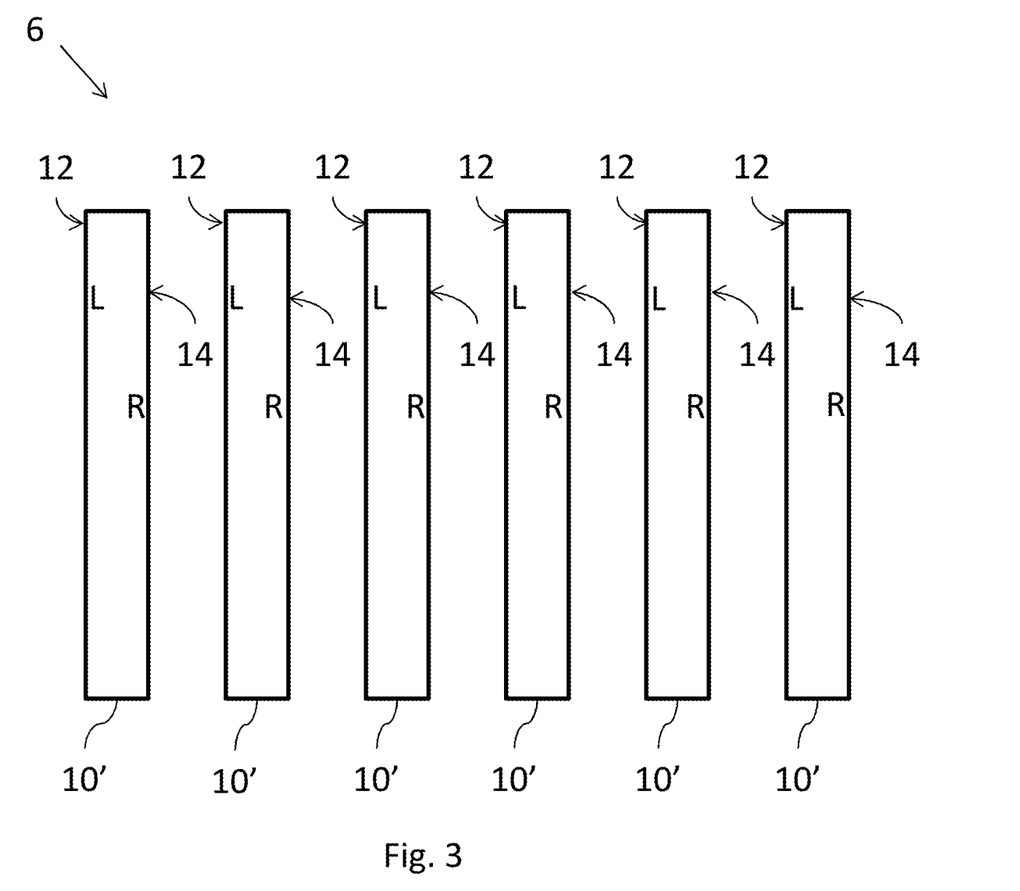
FIG. 3 illustrates a method of manufacturing a LOE according to a second embodiment of the presently disclosed subject matter.

Referring now to FIGS. 2A, 2B and 3, there are illustrated two methods of fabricating a LOE of the present invention in accordance with certain embodiments of the presently disclosed subject matter. Both methods initially provide a plurality of transparent plates 10, where each plate has been polished on two opposite surfaces such that the opposite surfaces are parallel to one another. For purposes of clarity, in the foregoing description, the two opposite surfaces may sometimes be referred to as the "left" and "right" surfaces. It should be understood that for the purposes of the invention these descriptive designations are meant only to differentiate the two opposing surfaces for the purpose of the present description, but are not in any way indicative of any particular order and/or optical properties of the plates either during processing or in the final product.

As shown in FIGS. 2A, 2B and 3, a first coating, being a partially reflective coating 12, is then coated onto one of the surfaces of at least some of the plates 10 (referred to herein as a "subset" of the plates). In FIGS. 2A, 2B and 3 the plates in the subset are indicated as 10'. By way of example, FIGS. 2A, 2B and 3 show the partially reflective coating 12 applied to the left surface of plates 10'. A second coating, which depending on the particular embodiment can be either the same coating or a different coating, is then coated onto the second surface of plates 10', as will be detailed below.

In certain embodiments, some LOEs may require different amounts of reflectivity in the different plates. Therefore, the reference to a "first coating" or "partially reflective coating" should be taken to refer to one coating from a group of coatings which are all partially reflective but may vary in their respective reflective parameters. In certain embodiments, the reflective parameters can be progressively changed for each subsequent surface according to the specific LOE design requirements.

In a first embodiment, as illustrated in FIG. 2A, the subset of plates is composed of alternating plates, and each plate 10' in the subset is coated on both the left and right surfaces with the partially reflective coating 12. The remaining plates are not coated. Since coated plates are coated on both sides with similar coatings, any coating-induced stress imposed on such plates is imposed equally on both opposing surfaces, thereby reducing or eliminating the warping effect. It should be understood that "similar" coatings refer to coatings of similarly imposing stress that may or may not be fabricated with the same compositions, number of layers, and total thickness.

Figure 4A:
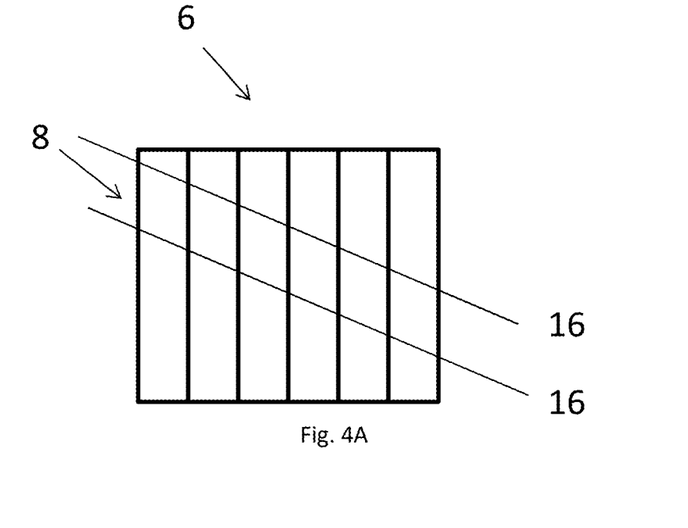
FIG. 4A illustrates a stack cut along parallel planes according to a first embodiment of the presently disclosed subject matter.
Figure 4B:
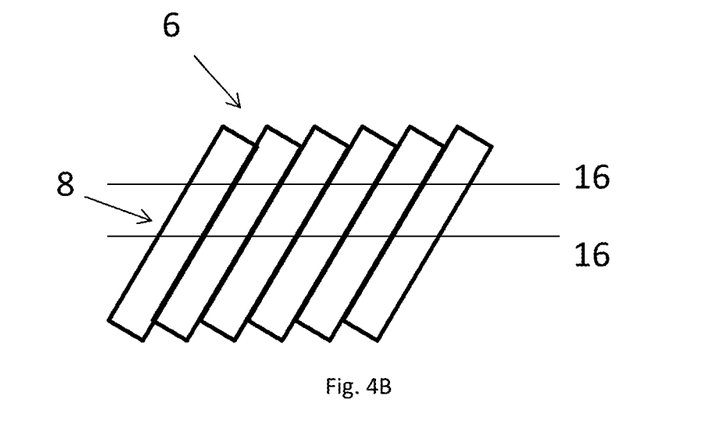
FIG. 4B illustrates a stack cut along parallel planes according to a second embodiment of the presently disclosed subject matter.

It should be noted that, as shown in FIGS. 4A-4B, plates are joined together to form the LOE, therefore there is no need to coat every plate with the partially reflective coating, i.e. it makes no difference to the optical properties which plate, as between two adjoining plates, has the coating. Therefore, the inventors have found it advantageous to apply the partially reflective coating to both surfaces of every other plate, and no coating on the other plates. This way, any deviation in the flatness of a plate caused by the coating is balanced by a likewise deviation on the other side, reducing or eliminating the overall curvature of the plate. In addition, the plates can be coated on both sides simultaneously.

In certain particularly preferred embodiments, and as shown in FIG. 2B, in cases where there are an uneven number of optically active surfaces, plate 10" (which could be the last plate as shown in FIG. 2B, or it can alternatively be a plate positioned anywhere in the stack) is coated on one surface with the partially reflective coating 12 and on the opposing surface with a neutralizing coating 14, as will be further detailed below with reference to the second embodiment as shown in FIG. 3.

The partially reflective coatings are preferably implemented as multi-layer dielectric coatings with layers having alternating high and low (and possibly also an intermediate value) refractive indices, and with differing layer thicknesses, where the thicknesses and layer properties are chosen according to algorithms to provide the desired optical properties, all as is known in the art, and as can be derived using standard software tools known in the art. Similarly, the second coating is preferably implemented using the same approach and technology, but where the defined optical properties are those of an anti-reflective coating for all relevant angles. The anti-reflective properties could typically be achieved with a smaller number of layers than the partially reflective coatings but are preferably implemented using the same number of layers as the partially-reflective coating in order to achieve the similar mechanical properties, as discussed further below.

In a second embodiment, as illustrated in FIG. 3, the subset of plates is composed of all plates, and each plate 10' in the subset is coated on the first surface (e.g. show as the left surface in FIG. 3) with the partially reflective coating 12, and is coated on the second surface (e.g. show as the right surface in FIG. 3) with a neutralizing coating 14. The neutralizing coating 14 has no discernable effect on the transmission of light (i.e. is non-reflective), but has mechanical properties, namely stress characteristics, substantially similar to the partially reflective coating 12. Therefore, with the application of the neutralizing coating 14 on the other surface (i.e. the surface without coating 12) substantially equivalent stress is imposed on both surfaces of each coated plate, thereby reducing or eliminating the warping effect. In this embodiment, while each plate is coated, the plates are coated on both sides with coatings that have equivalent stress characteristics. As a result, similar to the first embodiment, any deviation in the flatness of a plate caused by the coating is balanced by an equal deviation on the other side, reducing or eliminating the overall curvature of the plate.

In certain embodiments, the neutralizing coating 14 is an anti-reflective coating, as mentioned. In certain particularly preferred implementations, the anti-reflective coating is a coating of similar layer compositions and number of layers as the partially reflective coating but applied with thicknesses chosen to produce anti-reflective optical properties. In many cases, the use of the same number of layers with the same compositions, just with different thicknesses, provides a sufficiently similar stress effect to reduce any residual warping of the plates to acceptable levels. However, the use of different layer compositions and/or numbers of layers for the "stress-neutralizing" coating also falls within the scope of the present invention.

In certain embodiments, the partially reflective coating and the neutralizing coating can be applied to a plate simultaneously. In certain embodiments, after applying the coatings, the plates can warp and then get corrected. In certain embodiments, the stress is caused by the coating process and/or during cooling after the coating is applied.

It should be noted that by "substantially similar" mechanical properties, it is meant that the mechanical properties are sufficiently similar that warping of the plates is reduced, and preferably eliminated. In many cases, there will in fact be differences in layer thickness between the coatings on the two sides of the plate, either to achieve slightly different proportions of reflectance/transmittance and/or to achieve anti-reflective properties, but the use of similar sequences of coatings, particularly where the number of layers and their compositions are the same, have been found in many cases to be "substantially similar" to the extent that they achieve a sufficiently high degree of stress cancellation for a high quality product.

Referring now to FIGS. 4A-4B, as in the prior art methods, in both of the above described embodiments, the LOE 8 is then formed by bonding together the plates to form a stack 6, and cutting the stack along parallel planes 16 obliquely angled to the faces of the plates so as to form the optical element. In certain embodiments, the plates could be bonded in an adhesive-free bonding process, such as anodic bonding.

In some embodiments, as shown in FIG. 4A, the plates can be stacked without angling, in which case the stack 6 is cut along parallel planes that are angled relative to the surfaces of the plates. In other embodiments, as shown in FIG. 4B, the plates themselves are angled in the stack, in which case the stack 6 is cut straight. In some embodiments (not shown), the stack can be cut along additional planes, e.g. to form a two-dimensional waveguide.

Figure 5A:
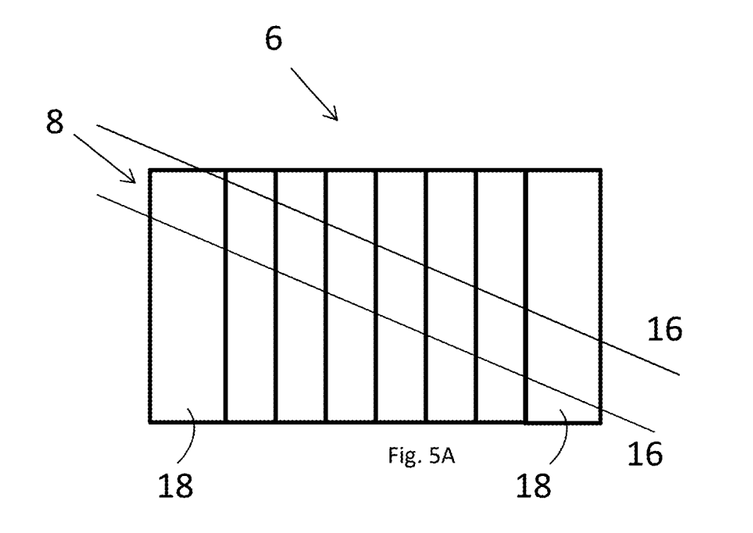
FIG. 5A illustrates an alternative stack to FIG. 4A, cut along parallel planes according to a second embodiment of the presently disclosed subject matter.
Figure 5B:
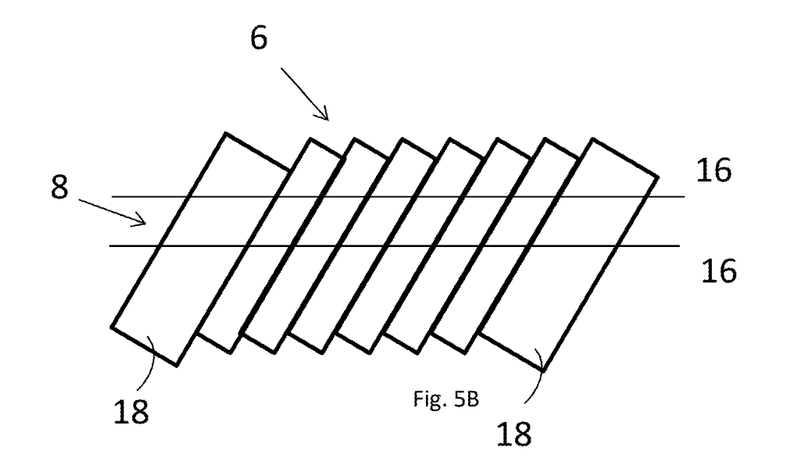
FIG. 5B illustrates an alternative stack to FIG. 4B, cut along parallel planes according to a second embodiment of the presently disclosed subject matter.

Referring to FIGS. 5A-5B, in some embodiments, there may be attached at the ends of the stack 6 one or more end plates 18 having a different thickness than plates 10. In some embodiments, end plates 18 can also be coated with one or more coatings. These coatings can be the same or different coatings than the coatings applied to plates 10. In certain most particularly preferred embodiments, no coatings are applied to end plates 18.

In certain embodiments, some LOEs may require different amounts of reflectivity in the different plates. Therefore, the reference to a "first coating" or "partially reflective coating" should be taken to refer to one coating from a group of coatings which are all partially reflective but may vary in their respective reflective parameters. In certain embodiments, the reflective parameters can be progressively changed for each subsequent surface according to the specific LOE design requirements.

Figure 6A:
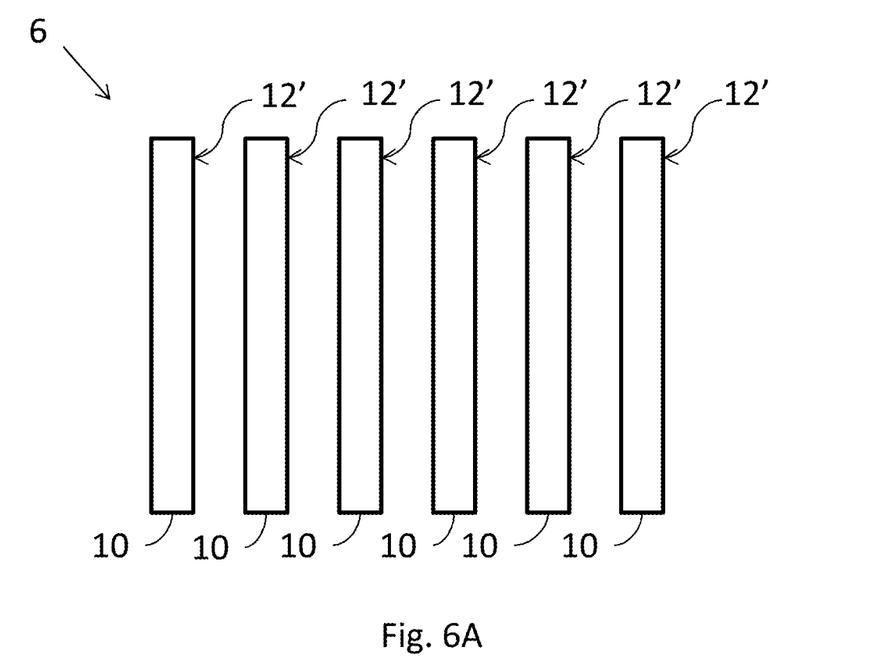
FIGS. 6A-6B illustrate an embodiment of a single-side coating according to yet another embodiment of the presently disclosed subject matter.
Figure 6B:
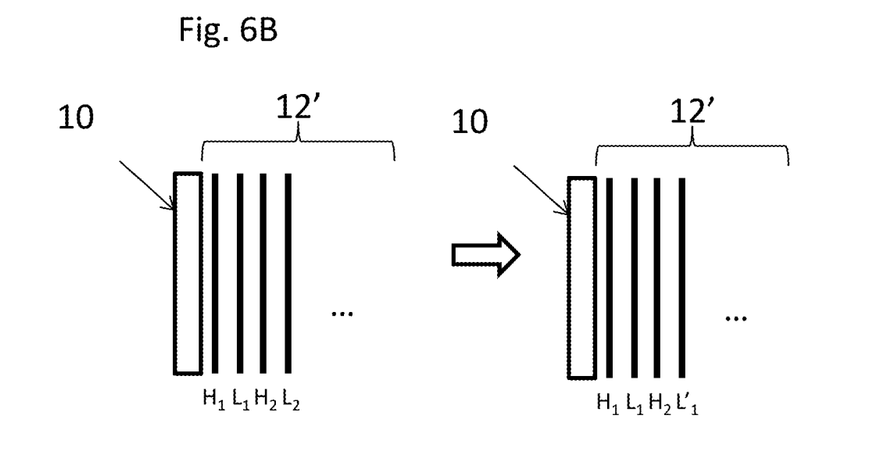

FIGS. 6A-6B illustrate schematically an embodiment in which each of plates 10 can be coated on one side only. Referring now to FIG. 6A, in some embodiments, each of the plurality of plates 10 in stack 6 is coated with a partially reflective coating 12'. Referring now to FIG. 6B, coating 12' may be comprised of alternating layers of a high index coating H having refractive index $R_h$, and low index coating L having refractive index $R_l$, where $R_h > R_l$. For example coating 12' can consist of alternating coatings $H_1$, $L_1$, $H_2$, $L_2$ . . . , etc. where $H_1$ is applied to the plate surface, followed by $L_1$ applied over $H_1$, followed by $H_2$ applied over $L_1$, followed by $L_2$ applied over $H_2$ . . . etc. as shown in the left-hand side of FIG. 6B. It should be understood that coatings H and/or L can themselves be comprised of multiple different coating materials that when combined achieve the desired refractive index, i.e. $R_h$ for the H coating layer and $R_l$ for L coating layer.

Since each of coatings H and L have respective inherent stress characteristics (tensile or compressive) when applied to the surface of a plate (which may vary according to the specific temperature, thickness, coating procedure, etc.) the overall stress of coating 12' can be calculated using known techniques such as the Stoney equation. The overall stress of 12' may be undesirable and causing warping of plate 10 when applied to one side of each plate, as discussed above.

However, the inventors have found that it is possible to substitute some of the H or L layers with a substitute H' or L' (as the case may be) made of a different material or combination of materials as shown in the right-hand portion of FIG. 6B. In this case, a coating 12' can be designed and constructed engineered to have overall neutral stress in the sense of having minimal or no tensile or compressive stress on plate 10. Thus coating 12' may now be applied to one side of each of plates 10 without causing undesirable warping of the plates.

For example, consider a coating consisting of seventeen (17) alternating layers of SiO2 (R~1.42) and Ta2O5 (R~2.075) applied from the plate surface outward as:

Layers 1, 3, 5, 7, 9, 11, 13, 15, 17=TA2O5
Layers 2, 4, 6, 8, 10, 12, 14, 16=SIO2

In this case, coating 12' will have an overall tensile stress of around 6 minutes over 216.4 MPa, which is undesirable for a single side coating. However, if some of the L layers (i.e. SiO2) are replaced with layers of L'=MgF2 (R~1.38), e,g.:

Layers 1, 3, 5, 7, 9, 11, 13, 15, 17: TA2O5
Layers 2, 4, 6, 14, 16: SIO2
Layers 8, 10, 12: MgF2 the MgF2 layers effectively neutralize the overall stress of coating 12' such that the overall stress created by coating 12' on plate 10 is minimal and therefore acceptable for a single side coating. It should be noted that the number of layers to be replaced is defined by the overall stress in the design and can change depending on number and stress properties of the materials and design and layers thicknesses.

It should further be noted that the refractive index of the substituted layer H' or L' should preferably have no more than a 6% deviation from the refractive index of the primary layer H or L (as the case may be).

The LOE fabricated according to the teaching of the presently disclosed subject can be used in a variety of applications, such as the various near-eye displays and associated applications described in patents and patent applications of Lumus (Israel).

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A light-guide optical element having at least one pair of parallel external surfaces configured for trapping light waves inside the light-guide optical element by total internal reflection, the light-guide optical element comprising:
   a plurality of internal partially reflecting surfaces made from a plurality of transparent plates, each plate having opposite first and second surfaces that are non-parallel to the pair of parallel external surfaces, each plate polished on said first and second surfaces such that said first and second surfaces are parallel to each other;
   wherein each plate in a subset of the plurality of transparent plates is coated on the first surface with a first coating and coated on the second surface with a second coating, wherein the first coating is a partially reflective coating having a first set of mechanical properties, and the second coating is a partially reflective coating having a second set of mechanical properties substantially similar to the first set of mechanical properties so as to reduce or eliminate the amount of warping of the plate due to stress on the plate caused by the coating, and
   wherein the plurality of transparent plates are bonded together to form a stack comprising an alternating arrangement of coated plates of the subset of plates and uncoated plates.

2. The light-guide optical element of claim 1, wherein the first and second coatings are substantially the same.

3. A light-guide optical element having at least one pair of parallel external surfaces configured for trapping light waves inside the light-guide optical element by total internal reflection, the light-guide optical element comprising:
   a plurality of internal partially reflecting surfaces made from a plurality of transparent plates, each plate having opposite first and second surfaces that are non-parallel to the pair of parallel external surfaces, each plate polished on said first and second surfaces such that said first and second surfaces are parallel to each other;
   wherein each plate in a subset of the plurality of transparent plates is coated on the first surface with a first coating, wherein the first coating is a partially reflective coating comprised of a plurality of layers of alternating high refractive index coating material and low refractive index coating material,
   wherein a first subset of the plurality of layers of the low index coating material is comprised of a first coating material have a first refractive index, and a second subset of the plurality of layers of the low index coating material is comprised of a second coating material have a second refractive index, and
   wherein the combination of the high index coating material, first low index coating material and second low index coating material is effective to neutralize a stress imposed by the first coating on said plates.

* * * * *